(12) United States Patent
Bourlon et al.

(10) Patent No.: US 6,192,685 B1
(45) Date of Patent: Feb. 27, 2001

(54) MASTER CYLINDER FOR MOTOR VEHICLE ELECTRO-HYDRAULIC BRAKING INSTALLATION

(75) Inventors: Philippe Bourlon, Aubervilliers; Roland Levrai, Stains; Werner Quirant, Pantin, all of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/214,649
(22) PCT Filed: Dec. 21, 1998
(86) PCT No.: PCT/FR97/02814
  § 371 Date: Jan. 8, 2000
  § 102(e) Date: Jan. 8, 1999

(30) Foreign Application Priority Data

Dec. 22, 1997 (FR) .................................................. 97 16219

(51) Int. Cl.$^7$ ..................................................... B60T 17/00
(52) U.S. Cl. ................................. 60/566; 60/582; 60/591
(58) Field of Search .............................. 60/566, 565, 591, 60/582, 588, 589

(56) References Cited

U.S. PATENT DOCUMENTS 4,812,777 * 3/1989 Shirai ....................................... 303/14
5,887,432 * 3/1999 Clauss et al. .......................... 60/562

* cited by examiner

Primary Examiner—F. Daniel Lopez
Assistant Examiner—Thomas E. Lazo
(74) Attorney, Agent, or Firm—Leo H. McCormick, Jr.; Warren Comstock

(57) ABSTRACT

A master cylinder (32) in a vehicle hydraulic braking installation uhydraulic-fluid supply device for actuating wheel brake cylinders (20). The master cylinder (32) being isolated from the wheel brake cylinders (20) by at least one shut-off valve (30). The master cylinder (32) being associated with a simulator (46) having a piston (50) located in a simulator chamber (56). The piston (50) being subjected to fluid pressure of brake fluid from the master cylinder (32) and an elastic element (52). The master cylinder (32) being of the having a primary piston (44) and a secondary piston (60) slidably located in a bore (45) of a housing (48). Bore (45) has a peripheral groove (72) which is associated with a land (68) on the secondary piston (60) to allow communication with the simulator chamber (56) when the master cylinder (32) is in a positon of rest. A sealing element (70) carried by the secondary piston (60) engages the housing when the secondary piston moves to interrupt communicaton between the bore (45) and simulator chamber (56) to thereafter simulate brake actuation travel.

13 Claims, 4 Drawing Sheets

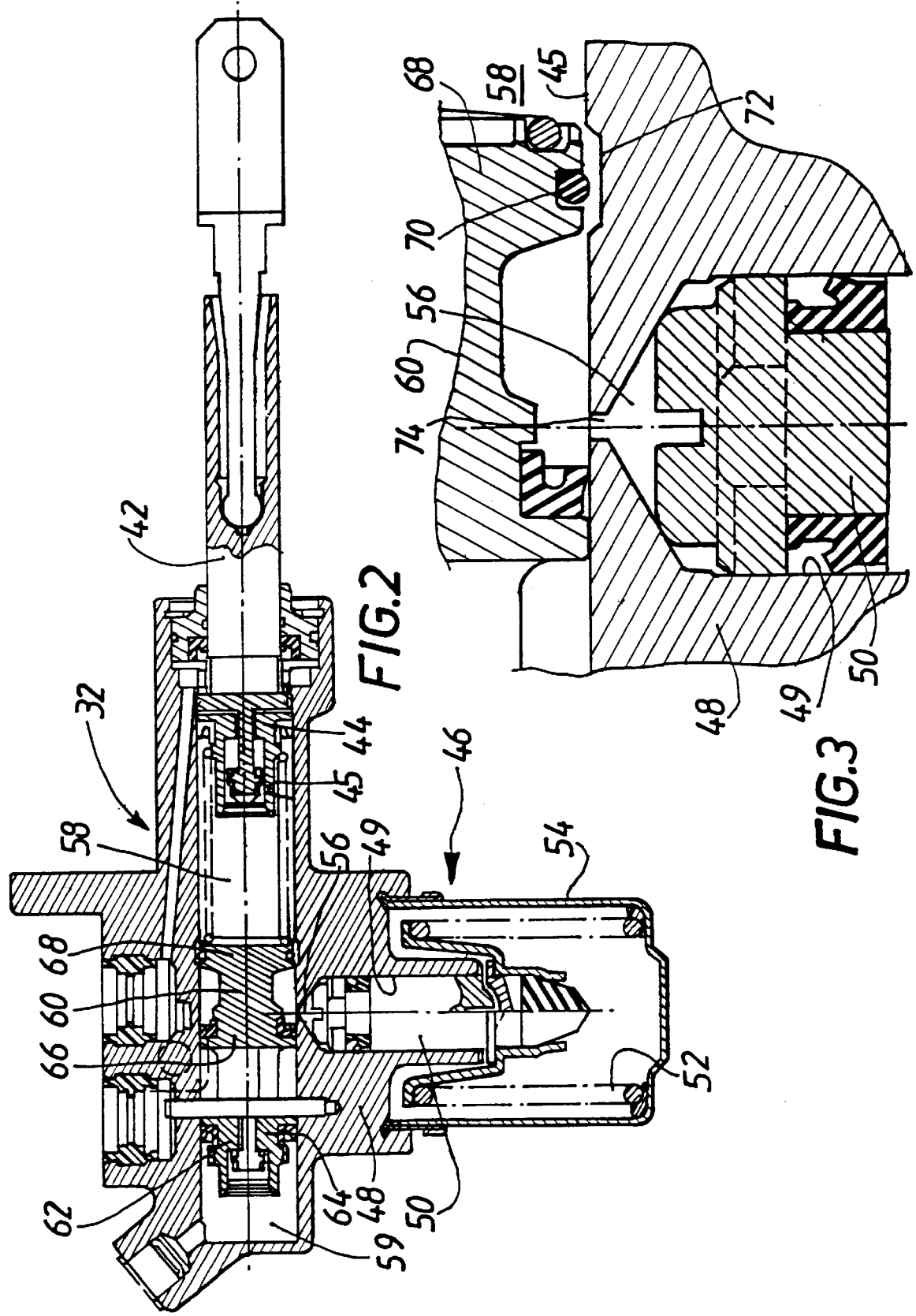

MASTER CYLINDER FOR MOTOR VEHICLE ELECTRO-HYDRAULIC BRAKING INSTALLATION

The present invention relates to a master cylinder intended in particular to equip a motor vehicle electro-hydraulic braking installation.

BACKGROUND OF THE INVENTION

Electro-hydraulic braking installations conventionally comprise a service braking system using an external energy source and an emergency braking system using muscle power as its source, these two braking systems being controlled by a brake master cylinder, the actuating pedal of which is situated in the cockpit of the vehicle.

The braking system with an external energy source comprises a generator of brake fluid at high pressure, comprising a hydraulic pump associated with a hydraulic pressure accumulator. Upon a braking action performed by this system, the pressure supplied by the hydraulic pressure accumulator is communicated to the wheel brake cylinders via at least one solenoid valve so that the pressure leaving this solenoid valve has a value which is a function of the travel of the brake pedal and of the force with which this pedal is actuated, or a function of the force with which a handbrake lever is actuated, or alternatively a function of the brake fluid pressure produced using the footbrake pedal or the handbrake lever.

In such operation in service braking mode, the master cylinder is normally isolated from the braking installation of the vehicle by means of a shut-off solenoid valve. This then means that brake fluid cannot flow back from the master cylinder towards the wheel brake cylinders and that its piston cannot move or can move only by a minimum travel. However, for the brake pedal or handbrake lever to have a normal actuating travel, depending on the force with which they are actuated, a device which simulates the brake actuation travel is used.

Such a device that simulates the brake actuation travel is known, for example, from document U.S. Pat. No. 4,462,642. The known brake actuation travel simulator comprises a simulator cylinder with a simulator piston which can move in this cylinder when it is acted upon by the pressure of the brake fluid from the master cylinder, against the action of a spring and which can move inside this cylinder.

In the event of failure of the braking system with an external energy source, for service braking mode, the shut-off solenoid valve is switched to allow the master cylinder to actuate the wheel brake cylinders itself, for an emergency braking operating mode using as its energy source muscle power provided by the driver of the vehicle.

The brake actuation travel simulator device according to the aforementioned document is hydraulically connected to the master cylinder and to the shut-off solenoid valve and communicates, even in emergency braking mode, with the brake master cylinder. The known brake-actuating simulator therefore has the drawback of absorbing a certain amount of brake fluid in emergency braking mode using muscle power, and this needlessly increases the brake pedal travel and detracts from the effectiveness in emergency braking.

SUMMARY OF THE INVENTION

The present invention falls within this context in that it proposes, in the known way, a master cylinder for a vehicle hydraulic braking installation, the installation comprising a service braking system using external energy, and an emergency braking system using muscle power for actuating wheel brake cylinders, it being possible for the master cylinder to be isolated from the wheel brake cylinders by at least one shut-off valve for service braking using external energy, the master cylinder being associated with a simulator simulating the brake actuation travel and comprising a simulator piston defining a simulation chamber which can receive brake fluid from the brake master cylinder, an elastic simulator element urging simulator piston against the action of the pressure of the brake fluid in the simulation chamber, the master cylinder being of the tandem type and comprising a bore in which a primary piston and a secondary piston are mounted so that they can slide from respective positions of rest and therein delimit a primary working chamber and a secondary working chamber, respectively.

In this context, the object of the present invention is to propose a master cylinder, associated with a brake actuation travel simulation device for a motor vehicle electro-hydraulic braking installation which allows an emergency braking mode using muscle power, in which all of this muscle power is used for the emergency braking without this power being dissipated into other devices, it being necessary for this master cylinder to be reliable under all circumstances, easy to manufacture and low in cost.

To this end, the master cylinder of the invention, which in other respects is in accordance with the above preamble, is essentially characterized in that the simulation chamber has an inlet orifice opening into the bore, and in that means of selective communication connect the simulation chamber to the primary working chamber when the secondary piston is in its position of rest, and isolate the simulation chamber from the primary working chamber when the secondary piston is moved away from its position of rest.

According to a first embodiment of the invention, the means of selective communication comprise a peripheral groove formed in the bore and a sealing element borne by the secondary piston and capable selectively of shutting off the bore some distance from the peripheral groove, the peripheral groove being arranged in the bore between the primary piston and the inlet orifice of the simulation chamber, and the sealing element being located selectively facing the peripheral groove when the secondary piston is in its position of rest.

According to a second possible embodiment of the invention, the means of selective communication comprise: an axial hole made in the secondary piston and having an inlet opening into the primary working chamber; a radial hole made in the secondary piston and having an outlet permanently communicating with the simulation chamber and selectively placed in communication with the inlet of the axial hole; and an elongate plunger which is stationary with respect to the bore, mounted so that it can slide in the axial hole and interacting at least with the axial hole of the secondary piston to form a hydraulic valve which selectively isolates the outlet of the radial hole from the inlet of the axial hole when the secondary piston is moved from its position of rest.

In this second embodiment, the plunger rests, for example, on a pin passing across the bore.

According to a first possible alternative form of the second embodiment of the invention, the plunger has a blind axial hole and a radial passage communicating with the blind axial hole, the radial passage forming a first seat for the hydraulic valve, being arranged selectively facing the radial hole of the secondary piston when this secondary piston is in its position of rest, and being shut off by the axial hole of the secondary piston which itself forms a second seat for the hydraulic valve, when this secondary piston is moved away from its position of rest.

According to a second possible alternative form of the second embodiment of the invention, the inlet of the axial hole in the secondary piston bears an annular seal which forms a first seat for the hydraulic valve and which is selectively shut off by the plunger, which itself forms a second seat for the hydraulic valve, when the secondary piston is moved away from its position of rest.

In this second embodiment, the plunger rests, for example, on a pin passing across the bore.

Other objects, features and advantages of the present invention will emerge more clearly from the description which follows of one embodiment given by way of an illustration with reference to the appended drawings in which:

BRIEF DESCRIPTION OF THE DRAWINGS

FIG. 2 depicts a longitudinal section of the master cylinder equipping the braking installation of FIG. 1, and corresponding to a first embodiment;

FIG. 3 depicts, on a larger scale, part of the master cylinder of FIG. 2,

DETAILED DESCRIPTION OF THE INVENTION

Figure 1:
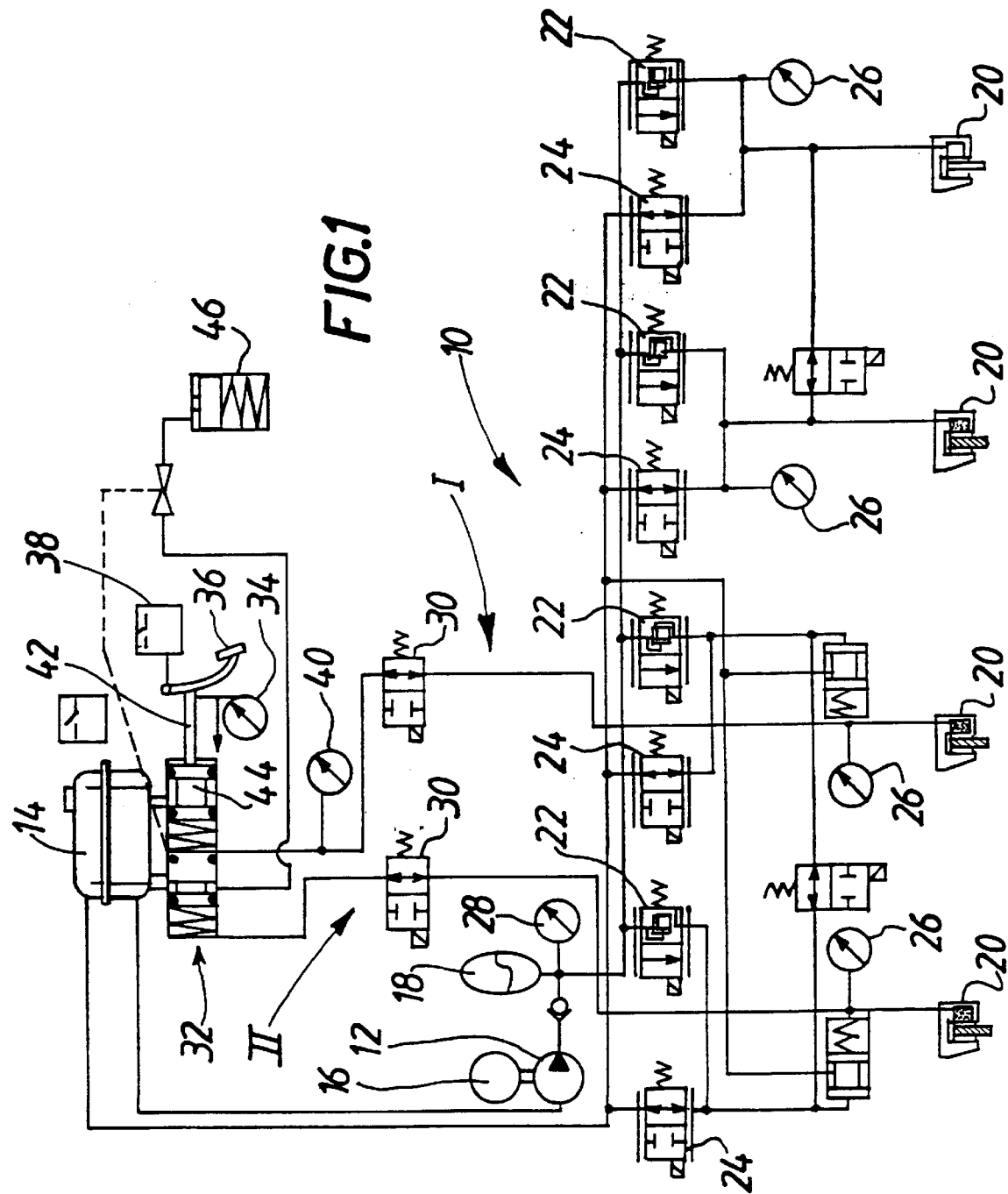
FIG. 1 depicts a diagrammatic view of a hydraulic braking installation incorporating a master cylinder in accordance with the present invention.

The vehicle braking installation depicted in FIG. 1 and noted overall by the reference 10 is designed in the form of a braking installation using external energy, connected to all the wheel brake cylinders, and of an emergency braking installation using muscle power, connected by two independent brake circuits I and II to the front wheel brake cylinders of the vehicle.

In FIG. 1, the brake circuits are depicted diagrammatically using hydraulic circuitry symbols: the external-energy brake circuit has, as its external energy source for service braking, a hydraulic pump 12 the intake of which is connected to a hydraulic fluid supply tank 14. The hydraulic pump 12 is driven by an electric motor 16. The delivery side of the hydraulic pump 12 is connected to a hydraulic accumulator 18 which delivers brake fluid under pressure for service braking, it being possible for a pressure-limiting valve (not depicted) to be connected between the intake and delivery pipes of the hydraulic pump 12 to limit the maximum delivery pressure of the hydraulic pump 12.

Wheel brake cylinders 20 are connected to the delivery pipe of the hydraulic pump 12 and to the hydraulic accumulator 18 via an inlet valve 22 allowing pressure in the cylinders 20 to increase. To drop the braking pressure in the wheel brake cylinders 22 [sic], an outlet valve 24 is provided which places the wheel brake cylinder 20 in communication with the supply tank 14. Any given braking pressure can thus be obtained in the wheel brake cylinders 20 using the inlet valve 22 and the outlet valve 24, controlled appropriately by a computer (not depicted) which also controls the operation of the pump motor 16 and which receives signals that represent the pressure in the wheel brake cylinders, these signals being delivered by pressure sensors 26, and signals representing the pressure in the hydraulic accumulator 18, delivered by a pressure sensor 28.

In the event of failure of the braking installation using external energy, so to obtain emergency braking using muscle power, the brake circuits I and II are connected independently of one another, each by means of a shut-off valve 30, to a tandem master cylinder 32 on which the feed tank 14 is mounted and with which the brake master cylinder 32 communicates directly. The shut-off valve 30 is a twoway, two-position solenoid valve which is open in the position of rest, and which is also controlled by the computer.

During operation in service braking mode using external energy, the shut-off valve 30 is closed, that is to say that, from the hydraulic point of view, the brake master cylinder 32 is isolated from the vehicle braking installation. During service braking using external energy, the brake master cylinder 32 acts as a sensor of the reference value for the hydraulic pressure in the wheel brake cylinders 20, it being necessary for this pressure to be controlled by the computer. For this, the master cylinder 32 is equipped with a sensor 34 which senses the travel of the pedal 36 which actuates the master cylinder, and with a sensor 38 which detects actuation of this pedal 36, a sensor 40 being connected to the primary brake circuit to detect the pressure in the master cylinder, the signals provided by the sensors 34, 38 and 40 being delivered to the computer. As an alternative, provision could be made for the sensor 38 also to detect the force exerted by the driver of the vehicle on the pedal 36.

The vehicle braking installation 10 is actuated using the brake pedal 36, which actuates a control rod 42 of the brake master cylinder 32, this rod itself actuating a primary piston 44 sliding in a bore 45 formed inside the brake master cylinder 32.

Upon a service braking action using external energy caused by actuation of the brake pedal 36, the shut-off valves 30 are closed, and this means that brake fluid cannot be delivered from the master cylinder into the brake circuits I and II. In order that the driver of the vehicle should, however, experience the usual sensation of actuating the brake pedal 36, characterized by a given travel of the pedal 36 in relation with the pressure generated in the hydraulic circuit, and therefore with the feeling of slowing the vehicle down, a brake actuation simulator 46 is connected to the primary brake circuit I of the brake master cylinder 32.

As can best be seen in FIG. 2, the brake actuation simulator 46 comprises a simulator body 48 in which there is formed a bore 49 where a simulator piston 50 can slide in a sealed manner. The body 48 may be arranged in the form of a cartridge to be screwed into the master cylinder or, as has been depicted in FIG. 2, be of a single piece with the body of the master cylinder. The simulator piston 50 is subject to the action of a compression spring 52 which also bears on a cap 54 secured to the simulator body 48, and within the bore 49 it delimits a simulation chamber 56.

The way in which the braking installation just described functions will now be explained briefly, assuming that all the components are operational. Under this assumption, the shut-off valves 30 are energized by the computer each time the sensor 38 detects actuation of the brake pedal 36, which means that these valves 30 prevent communication between the master cylinder and the rest of the braking installation.

When the driver of the vehicle actuates the brake pedal 36, the control rod 42 actuates the primary piston 44 of the master cylinder which then generates an increase in pressure in the primary working chamber 58 situated between the primary piston 44 and a secondary piston 60 itself also sliding in the bore 45 and delimiting therein a secondary working chamber 59. This increase in pressure is communicated to the simulation chamber 56 and is exerted on the simulator piston 50, which then moves against the action of the compression spring 52.

More specifically, and as can best be seen in FIGS. 2 and 3, the secondary piston 60 is formed with a part 62 for sliding and guidance in the bore 45, for example by means of two lands 64 and 66 fitted with sealing cups. The secondary piston 60 is also formed with a land 68, of a diameter more or less equal to that of the bore 45, and fitted with an O-ring seal 70. The bore 45 is also formed, at the front end of the primary working chamber 58, with a peripheral groove 72, so that in the position of rest, the groove 72 lies facing the land 68 of the secondary piston 60. The simulation chamber 56 also opens out into the bore 45 downstream of the groove 72, via an opening 74.

When the pressure increases in the primary working chamber 58, brake fluid can thus be delivered to the simulation chamber 56, passing over the O-ring seal 70 and through the opening 74. This then allows the primary piston 44 to move. The stroke 34, actuation or force 38 and pressure 40 sensors then emit signals which are supplied to the computer which in turn controls the motor 16 of the pump 12 and the solenoid valves 22 and 24 in order to generate, within the wheel brake cylinders 20, an increase in pressure which corresponds to the signals received from these sensors, and therefore a braking action which is in relation with the action of the driver of the vehicle on the brake pedal.

When one of the components of the braking installation experiences a failure, this is detected by the computer which then commands the deenergizing of the shut-off valves 30, which return to their position of rest depicted in FIG. 1 and therefore allow communication between the master cylinder 32 and the rest of the braking installation.

In this failure situation, when the driver of the vehicle actuates the brake pedal 36, the control rod 42 actuates the primary piston 44 of the master cylinder which then generates an increase in pressure in the primary working chamber 58 situated between the primary piston 44 and the secondary piston 60. As the shut-off valves 30 are then open, the pressure exerted on the secondary piston 60 generates on the latter a force which makes it move forward. In this movement, the land 68 moves and the O-ring seal 70 comes into contact with the bore 45, thus closing the communication between the primary working chamber 58 and the simulation chamber 56. The primary piston 60 then in turn causes an increase in pressure in the secondary working chamber 72 situated between it and the closed end of the bore 45. This increase in pressure is then communicated to the wheel brake cylinders by the hydraulic circuits I and II.

It can therefore indeed be seen that in this failure situation, the simulation chamber is taken out of the circuit, which means that all of the brake fluid from the primary and secondary chambers of the master cylinder is used to effect emergency braking using muscle power. All of the muscle power of the driver of the vehicle is thus used for emergency braking without this power being dissipated into other devices such as the travel simulator 46. The master cylinder is of a particularly simple design, which guarantees that it will be reliable and ensures a low manufacturing cost.

Figure 4:
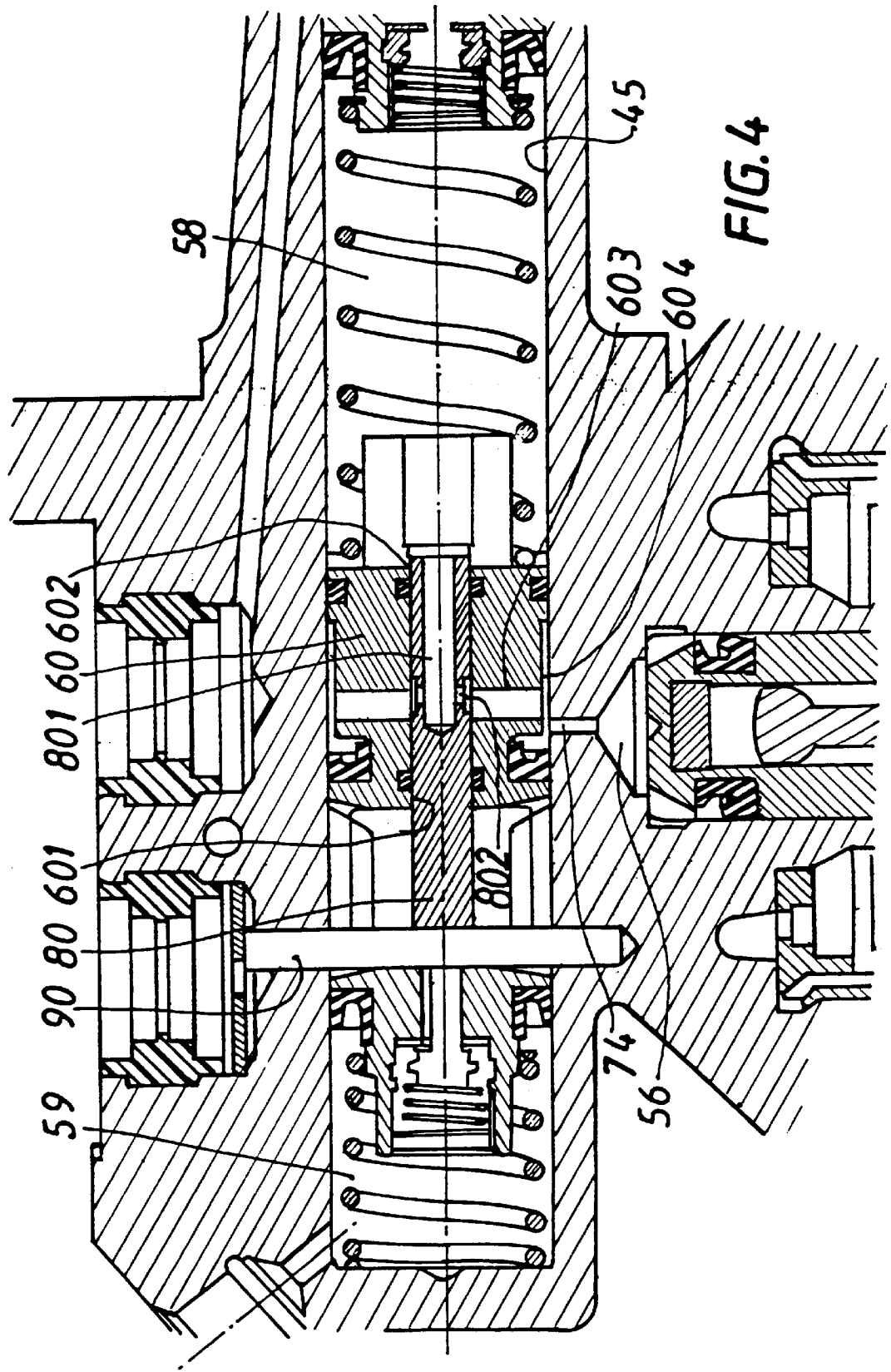
FIG. 4 is a view in enlarged part section of a master cylinder in accordance with a first alternative form of a second embodiment of the invention.
Figure 5:
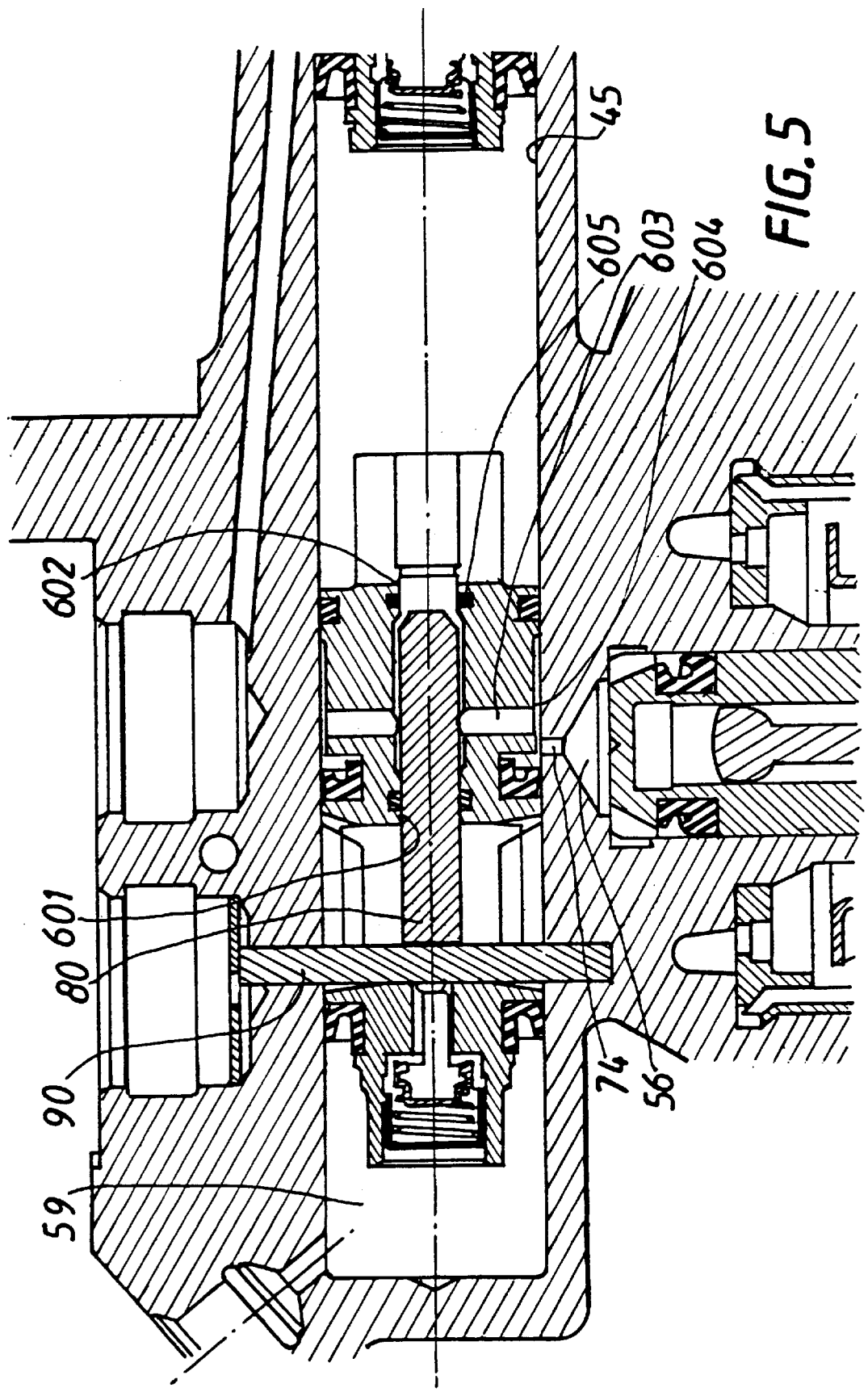
FIG. 5 is a view in enlarged part section of a master cylinder in accordance with a second alternative form of the second embodiment of the invention.

FIGS. 4 and 5 respectively illustrate first and second alternative forms of a second embodiment of the invention.

Just like in the first embodiment, the simulation chamber 56 has an inlet orifice 74 which opens into the bore 45, and means of selective communication are provided for connecting the simulation chamber 56 to the primary working chamber 58 when the secondary piston 60 is in its position of rest and for isolating the simulation chamber 56 from the primary working chamber 58 when the secondary piston 60 is moved away from its position of rest, that is to say if a component of the braking installation should fail.

More specifically, these means of selective communication essentially comprise (FIGS. 4 and 5) an axial hole 601 and a radial hole 603, both made in the secondary piston 60, and a plunger of elongate shape 80 which rests on a pin 90 passing across the bore 45 so as to remain stationary with respect to the bore 45.

The plunger 80 is mounted so that it can slide in the axial hole 601 of the secondary piston 60, this axial hole having an inlet 602 which opens into the primary working chamber 58.

The radial hole 603 in the secondary piston 60 has an outlet 604 which permanently communicates with the simulation chamber 56 and which is selectively placed in communication with the inlet 602 of the axial hole 601.

Finally, the plunger 80 interacts with the axial hole 601 to form, at least with it, a hydraulic valve that allows the outlet 604 of the radial hole 603 to be isolated from the inlet 602 of the axial hole 601 when the secondary piston 60 is moved away from its position of rest.

In the first alternative form (FIG. 4), the plunger 80 has a blind axial hole 801 and a radial passage 802 which communicates with this blind axial hole 801.

The radial passage 802, which forms a first seat for the hydraulic valve, is placed facing the radial hole 603 of the secondary piston 60 when this piston is in its position of rest.

By contrast, when the secondary piston 60 is moved away from its position of rest, the radial passage 802 finds itself shut off by the axial hole 601 of the secondary piston 60, which itself forms a second seat for the hydraulic valve, thus preventing brake fluid from flowing into the simulation chamber if a component of the braking installation should fail.

In the second alternative form (FIG. 5), the inlet 602 of the axial hole 601 in the secondary piston 60 bears an annular seal 605 which forms a first seat for the hydraulic valve.

Thus, when the secondary piston 60 is moved away from its position of rest, the annular seal 605 is shut off by the plunger 80 which itself forms a second seat for the hydraulic valve, so that any flow of brake fluid into the simulation chamber is prevented if a component of the braking installation should fail.

What is claimed is:

1. A master cylinder for a vehicle hydraulic braking installation, said installation comprising a service braking system using external energy, and an emergency braking system using muscle power for actuating wheel brake cylinders, said master cylinder being isolated from the wheel brake cylinders through at least one shut-off valve for service braking using external energy, said master cylinder being associated with a simulator simulating the brake actuation travel and comprising a simulator piston defining a simulation chamber which receives brake fluid from the brake master cylinder, an elastic simulator element for urging the simulator piston against the action of the pressure of the brake fluid in said simulation chamber, said master cylinder being of the tandem type and having a bore in which a primary piston and a secondary piston are mounted to respectively slide from respective positions of rest therein to delimit a primary working chamber and a secondary working chamber, characterized in that said simulation chamber has an inlet orifice opening into said bore, and in that means of selective communication connect said simulation chamber to said primary working chamber when said secondary piston is in said position of rest, and to isolate said simulation chamber from said primary working chamber when said secondary piston is moved away from said position of rest, said means of selective communication comprising a peripheral groove formed in said bore and a sealing element borne by said secondary piston and capable selectively of shutting off said bore some distance from said peripheral groove, said peripheral groove being arranged in said bore between said primary piston and said inlet orifice of said simulation chamber, and said sealing element being located selectively facing said peripheral groove when said secondary piston is in said position of rest.

2. The master cylinder according to claim 1, characterized in that said means of selective communication comprise: an axial hole made in said secondary piston and an inlet opening into said primary working chamber; a radial hole made in said secondary piston and an outlet opening permanently in communication with said simulation chamber and selectively placed in communication with said inlet of the axial hole; and an elongate plunger which is stationary with respect to said bore, said plunger being mounted to slide in said axial hole and interacting at least with said axial hole of said secondary piston to form a hydraulic valve which selectively isolates said outlet of said radial hole from the inlet of said axial hole when said secondary piston is moved away from said position of rest.

3. The master cylinder according to claim 2, characterized in that said plunger has a blind axial hole and a radial passage communicating with said blind axial hole, said radial passage forming a first seat for said hydraulic valve, said plunger being arranged to face said radial hole of said secondary piston when said secondary piston is in said position of rest, said plunger being shut off by the axial hole of the secondary piston by forming a second seat for the said hydraulic valve when said secondary piston moves away from said position of rest.

4. The master cylinder according to claim 3, characterized in that said plunger rests on a pin passing across the bore.

5. The master cylinder according to claim 2, characterized in that said inlet of the axial hole in said secondary piston has an annular seal which forms a first seat for the said hydraulic valve, said annular seal being selectively shut off by the plunger and forming a second seat for the said hydraulic valve when the secondary piston moves away from said position of rest.

6. The master cylinder according to claim 5, characterized in that said plunger rests on a pin passing across the bore.

7. The master cylinder according to claim 2, characterized in that said plunger rests on a pin passing across the bore.

8. A master cylinder for a vehicle hydraulic braking installation, said installation comprising a service braking system using external energy, and an emergency braking system using muscle power for actuating wheel brake cylinders, said master cylinder being isolated from the wheel brake cylinders through at least one shut-off valve for service braking using external energy, said master cylinder being associated with a simulator simulating the brake actuation travel and comprising a simulator piston defining a simulation chamber which receives brake fluid from the brake master cylinder, an elastic simulator element for urging the simulator piston against the action of the pressure of the brake fluid in said simulation chamber, said master cylinder being of the tandem type and having a bore in which a primary piston and a secondary piston are mounted to respectively slide from respective positions of rest therein to delimit a primary working chamber and a secondary working chamber, characterized in that said simulation chamber has an inlet orifice opening into said bore, and in that means of selective communication connect said simulation chamber to said primary working chamber when said secondary piston is in said position of rest, and to isolate said simulation chamber from said primary working chamber when said secondary piston is moved away from said position of rest, said means of selective communication comprising an axial hole made in said secondary piston and an inlet opening into said primary working chamber; a radial hole made in said secondary piston and an outlet opening permanently in communication with said simulation chamber and selectively placed in communication with said inlet of the axial hole; and an elongate plunger which is stationary with respect to said bore, said plunger being mounted to slide in said axial hole and interacting at least with said axial hole of said secondary piston to form a hydraulic valve which selectively isolates said outlet of said radial hole from the inlet of said axial hole when said secondary piston is moved away from said position of rest.

9. The master cylinder according to claim 8, characterized in that said plunger has a blind axial hole and a radial passage communicating with said blind axial hole, said radial passage forming a first seat for said hydraulic valve, said plunger being arranged to face said radial hole of said secondary piston when said secondary piston is in said position of rest, said plunger being shut off by the axial hole of the secondary piston by forming a second seat for the said hydraulic valve when said secondary piston moves away from said position of rest.

10. The master cylinder according to claim 9, characterized in that said plunger rests on a pin passing across the bore.

11. The master cylinder according to claim 8, characterized in that said inlet of the axial hole in said secondary piston has an annular seal which forms a first seat for the said hydraulic valve, said annular seal being selectively shut off by the plunger and forming a second seat for the said hydraulic valve when the secondary piston moves away from said position of rest.

12. The master cylinder according to claim 11, characterized in that said plunger rests on a pin passing across the bore.

13. The master cylinder according to claim 8, characterized in that said plunger rests on a pin passing across the bore.

* * * * *